UNITED STATES PATENT OFFICE.

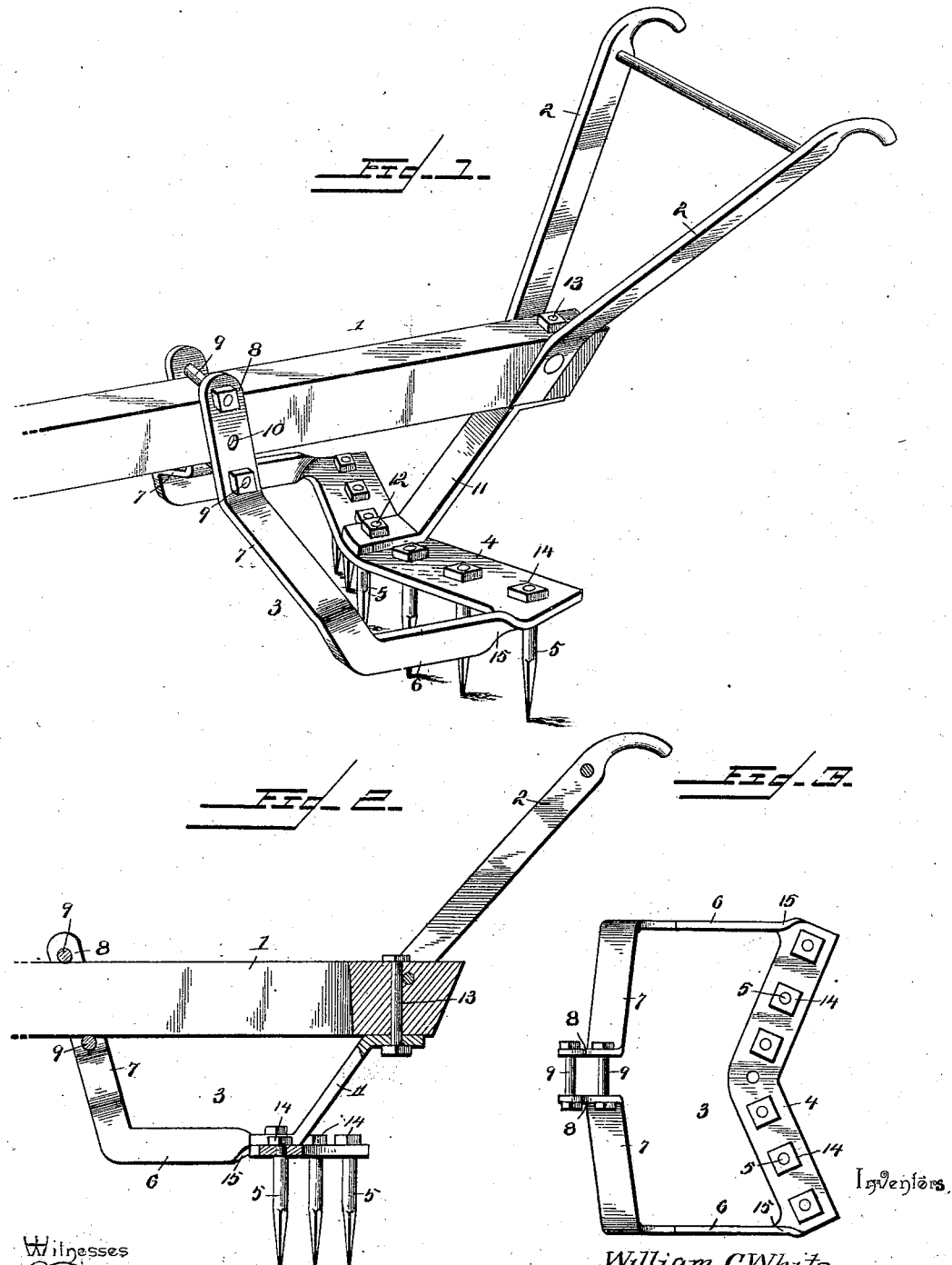

WILLIAM C. WHITE AND JOHN C. STEVENS, OF RISING STAR, TEXAS.

CULTIVATOR AND HARROW.

SPECIFICATION forming part of Letters Patent No. 552,163, dated December 31, 1895.

Application filed July 16, 1895. Serial No. 556,168. (No model.)

*To all whom it may concern:*

Be it known that we, WILLIAM C. WHITE and JOHN C. STEVENS, citizens of the United States, residing at Rising Star, in the county of Eastland and State of Texas, have invented a new and useful Cultivator and Harrow, of which the following is a specification.

Our invention relates to a cultivator or harrow, and has for its object to provide a simple, inexpensive and efficient device adapted to be used for general cultivating purposes, and particularly as a harrow.

Further objects and advantages of this invention will appear in the following description, and the novel features thereof will be particularly pointed out in the appended claim.

In the drawings, Figure 1 is a perspective view of a cultivator constructed in accordance with our invention provided with harrow-teeth. Fig. 2 is a central section of the same, partly broken away. Fig. 3 is a detail plan view of the tooth-carrying frame detached.

Similar numerals of reference indicate corresponding parts in all the figures of the drawings.

1 designates a beam which may be provided with the usual means for attaching the draft appliances, and rising from the rear end of the beam are the usual handles 2.

Attached to the beam for supporting cultivating or harrow teeth is a frame 3, having a horizontal V-shaped transverse bar 4 adapted to carry the cultivating-teeth 5 and fowardly-extending arms 6, which are integral with the transverse tooth-carrying bar and which are bent inward at intermediate points to form upwardly and inwardly inclined extensions 7, which terminate in approximately vertical cheek-plates 8 adapted to be secured by means of bolts 9 in contact with the opposite sides of the beam. Said bolts engage registering perforations in the cheek-plates and preferably extend above and below the beam, but said plates are provided with intermediate openings 10 through which a bolt may be passed to extend through the beam. Attached to the center or angle of the transverse tooth-carrying bar is a brace 11, a bolt 12 being employed to secure the lower end of the brace, and the upper end of the brace is secured in contact with the under side of the beam contiguous to its rear extremity by means of a bolt 13. The brace is inclined forwardly toward its lower end, and the extremities thereof, which are respectively in contact with the upper surface of the tooth-carrying bar and the under surface of the beam, are deflected or arranged at an angle to the body portion of the brace and parallel with each other.

The cultivating or harrow teeth may be secured in any suitable manner to the transverse bar, the means shown in the drawings consisting of reducing and threading the upper extremities of the teeth and engaging the latter above the surface of the bar by nuts 14.

From the above description it will be seen that the tooth-carrying frame comprising the transverse bar and the forwardly-extending arms are integral and may be struck from a single blank of metal, the arms being twisted, as shown at 15, contiguous to the extremities of the transverse bar, whereby the width of each bar is arranged in a vertical plane to resist vertical strain without bending. This arrangement of the arms in vertical planes also provides for laterally deflecting the extensions thereof in order to approach the side surfaces of the beam. The cheek-plates are integral with the inner extremities of the arm extensions and are arranged parallel and at a suitable interval to receive the beam. This construction is simple and strong and is well adapted for supporting the cultivating-teeth, the rearwardly and upwardly inclined brace which is attached to the center of the tooth-supporting bar being arranged approximately in the line of greatest strain upon the rear end of the frame.

The tooth-supporting bar is V-shaped in plan, with its angle in advance of its extremities and arranged under the beam, thus adding still further to the strength of the structure by eliminating to a great extent the elasticity of the metal or the tendency of the center of the tooth-supporting bar to bend or bow rearwardly.

Various changes in the form, proportion, and the minor details of construction may be resorted to without departing from the spirit or sacrificing any of the advantages of this invention.

Having described our invention, what we claim is—

The herein described frame for attachment to a cultivator beam, the same having a horizontal V-shaped tooth-supporting bar 4, terminal integral fowardly extending arms 6 struck from the same plate as the tooth-supporting bar and twisted as at 15 to occupy positions in planes perpendicular to the same, inwardly and upwardly inclined extensions 7 integral with the arms 6, and terminal parallel cheek-plates 8 integral with said extensions and adapted to be secured in contact with opposite side surfaces of the cultivator beam, substantially as specified.

In testimony that we claim the foregoing as our own we have hereto affixed our signatures in the presence of two witnesses.

WM. C. WHITE.
JOHN C. STEVENS.

Witnesses:
J. H. MONTGOMERY,
M. M. GIBSON.